Jan. 15, 1952                A. TAUB                2,582,916
SUPERCHARGING AND FUEL HEATING SYSTEM FOR
INTERNAL-COMBUSTION ENGINES
Filed Jan. 31, 1947                          3 Sheets-Sheet 1
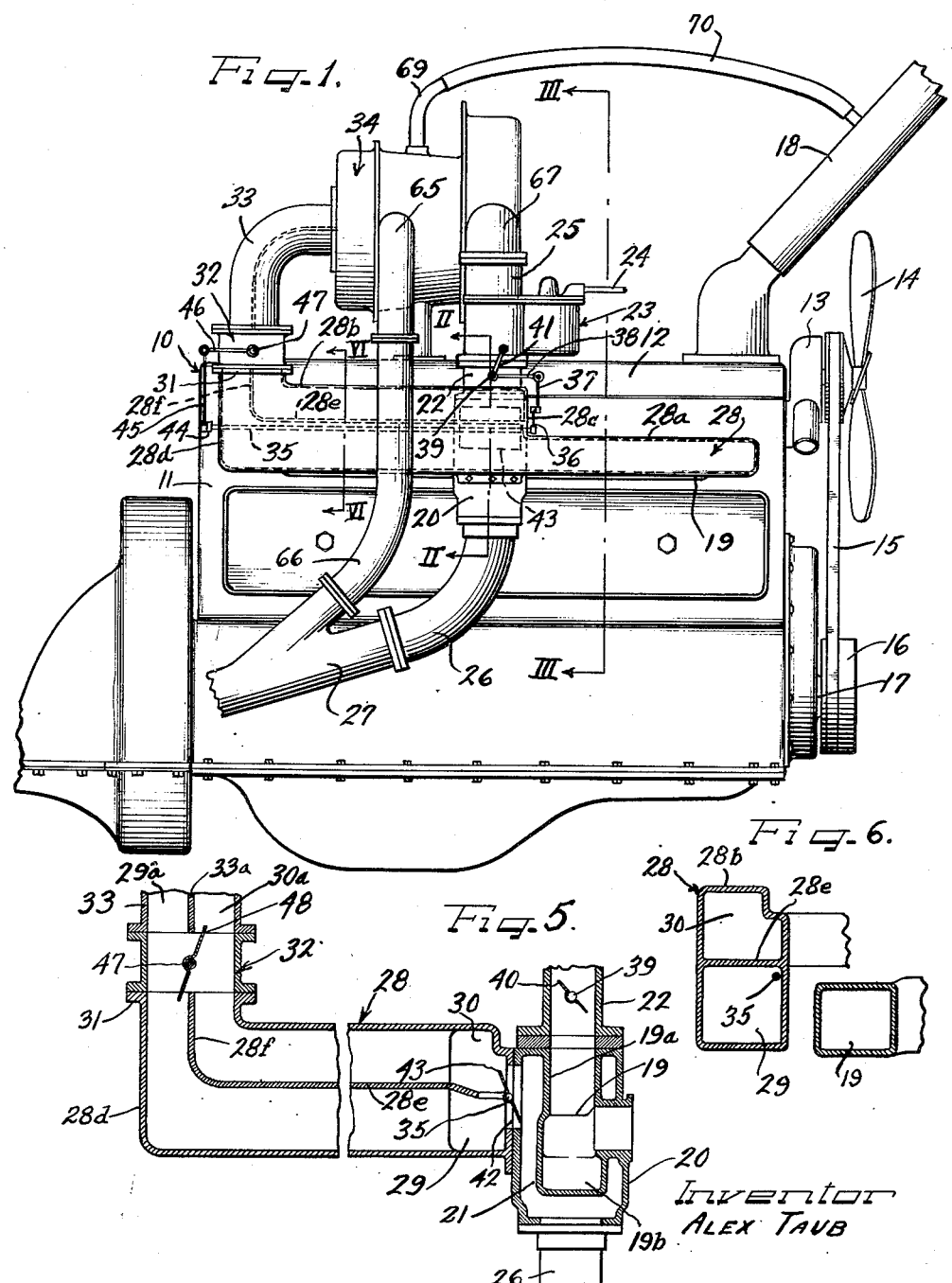
Inventor
ALEX TAUB
by The Firm of Charles Hills Attys.

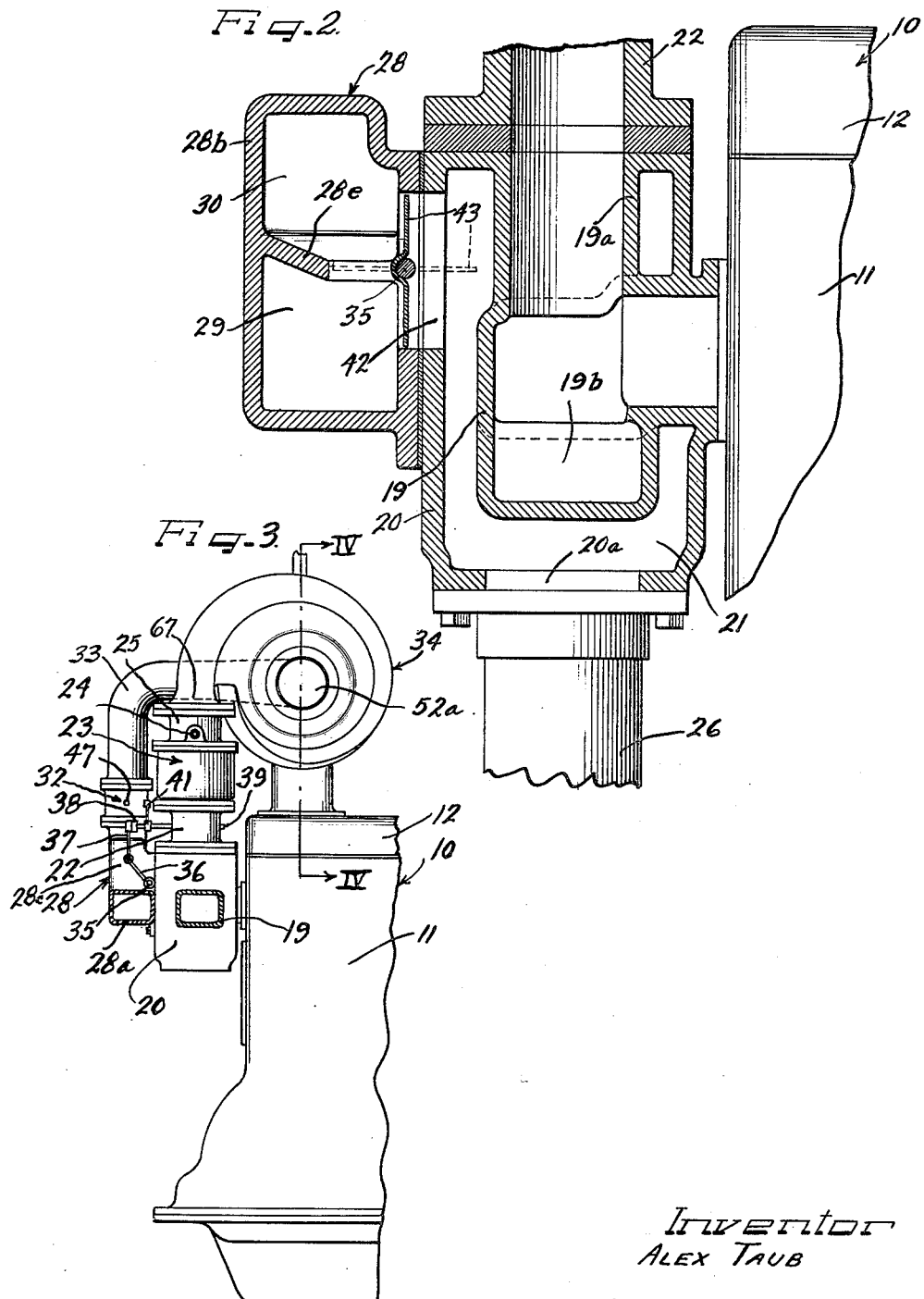

Patented Jan. 15, 1952

2,582,916

UNITED STATES PATENT OFFICE 2,582,916

SUPERCHARGING AND FUEL HEATING SYSTEM FOR INTERNAL-COMBUSTION ENGINES

Alex Taub, Washington, D. C., assignor to Thompson Products, Inc., Cleveland, Ohio, a corporation of Ohio Application January 31, 1947, Serial No. 725,613

7 Claims. (Cl. 60—13)

This invention relates to the selective control of exhaust gas flow from an internal combustion engine in accordance with the throttle setting of the engine to vary the air pressure and the temperature of the fuel charge to the engine.

Specifically, the invention relates to the selective utilization of exhaust gases from an internal combustion engine for driving a supercharger or for heating the fuel charge to the engine in accordance with the throttle conditions of the carburetor for the engine.

The fuel system of this invention is especially adapted for internal combustion engines of the truck and automobile type, and will hereinafter be specifically described in combination with a conventional water-cooled carburetor-fed automobile engine. It should be understood, however, that the invention is not limited to use with any particular type of engine since it is generally adapted for selective utilization of the temperature and driving force of exhaust gases to heat and supercharge the engine fuel charge.

In automobile engines it is customary to heat the air before it is introduced into the engine for the purpose of increasing the atomization of the fuel. Heating of the air, however, causes it to expand and thus reduces the mass of air introduced into the engine. Since the power developed by an engine is primarily a function of the weight of the air flowing to the engine, it is preferable not to heat the air when heat is unnecessary for volatilization. The heating of supercharged air certainly is not desired because expansion of the air by heat defeats the very purpose of the supercharger, viz., to pack more air into the fuel charge.

According to this invention the fuel charge to an internal combustion engine is heated by exhaust gases when the engine is operating under part throttle conditions. Under these conditions full engine power is not needed, the weight of the air flowing to the engine is reduced, and volatilization of the liquid fuel is enhanced by heat. Therefore, under these conditions, supercharging of the air for the fuel charge is not important. However, when the engine operates under substantially full throttle conditions, the exhaust gases are used, in accordance with this invention, for driving a supercharger instead of for heating the fuel charge. Under full throttle conditions, maximum power is wanted so air feed must be maximum, and, since heating of the air increases its volume, the air should be unheated.

The invention includes a control arrangement for selectively diverting the exhaust gases from the heater to the supercharger when the throttle is open. The supercharger is of the exhaust gas-turbine driven type and its speed determines the degree of supercharging.

A feature of the invention resides in the utilization of the water-cooling system of an internal combustion engine for cooling the bearings of the supercharger, and for preventing the supercharged air from being heated by the exhaust gases driving the supercharger.

Another feature of the invention resides in the provision of a supercharger with a hollow blade-carrying turbine wheel hub for insulating the bearings from the exhaust gases.

Another feature of this invention is the provision of a single rock shaft for controlling a plurality of gas flow-control valves or dampers.

An object of the invention is to provide a fuel system for an internal combustion engine wherein exhaust gases from the engine selectively drive a supercharger or heat a fuel charge in accordance with the throttle condition of the carburetor for the engine.

Another object of the invention is to provide an exhaust manifold arrangement for internal combustion engines wherein exhaust gases are selectively diverted for heating the fuel charge or for compressing air for the fuel charge.

A still further object of the invention is to provide an inexpensive, efficiently operated, and positively controlled exhaust gas-driven supercharger arrangement for an automotive engine.

A still further object of the invention is to provide an exhaust manifold arrangement for internal combustion engines wherein a damper-type valve selectively diverts gases to a heater or to the turbine wheel of a supercharger.

Another object of the invention is to provide a water-cooled supercharger for internal combustion engines.

A still further object of the invention is to provide an inexpensive supercharger for water-jacketed internal combustion engines with a cooling compartment receiving therethrough a flow of cooling water from the engine.

Another object of the invention is to provide a manifold arrangement for an internal combustion engine wherein exhaust gases from different cylinders flow in separate paths in the manifold to the turbine wheel of a supercharger for efficiently driving the supercharger.

A still further object of the invention is to utilize the heat and velocity energies of exhaust gases for selectively heating a fuel charge or supercharging air for the fuel charge.

Other and further objects of the invention will be apparent to those skilled in the art from the following detailed description of the annexed sheets of drawings which, by way of a preferred example only, illustrate one embodiment of the invention.

In the drawings:

Figure 1 is a side elevational view of an automobile-type internal combustion engine equipped with a fuel system according to this invention.

Figure 2 is a fragmentary vertical cross-sectional view, with parts in end elevation, taken along the line II—II of Figure 1.

Figure 3 is a fragmentary end elevational view, with parts in vertical cross section, taken along the line III—III of Figure 1.

Figure 5 is a broken fragmentary somewhat diagrammatic vertical cross-sectional view for illustrating the relative positions of the valves or dampers in the system of this invention, the exhaust manifold being rotated 90 degrees from its position as shown in Figure 1.

Figure 6 is a fragmentary, cross-sectional view taken along the line VI—VI of Figure 1.

As shown on the drawings:

Figure 4:
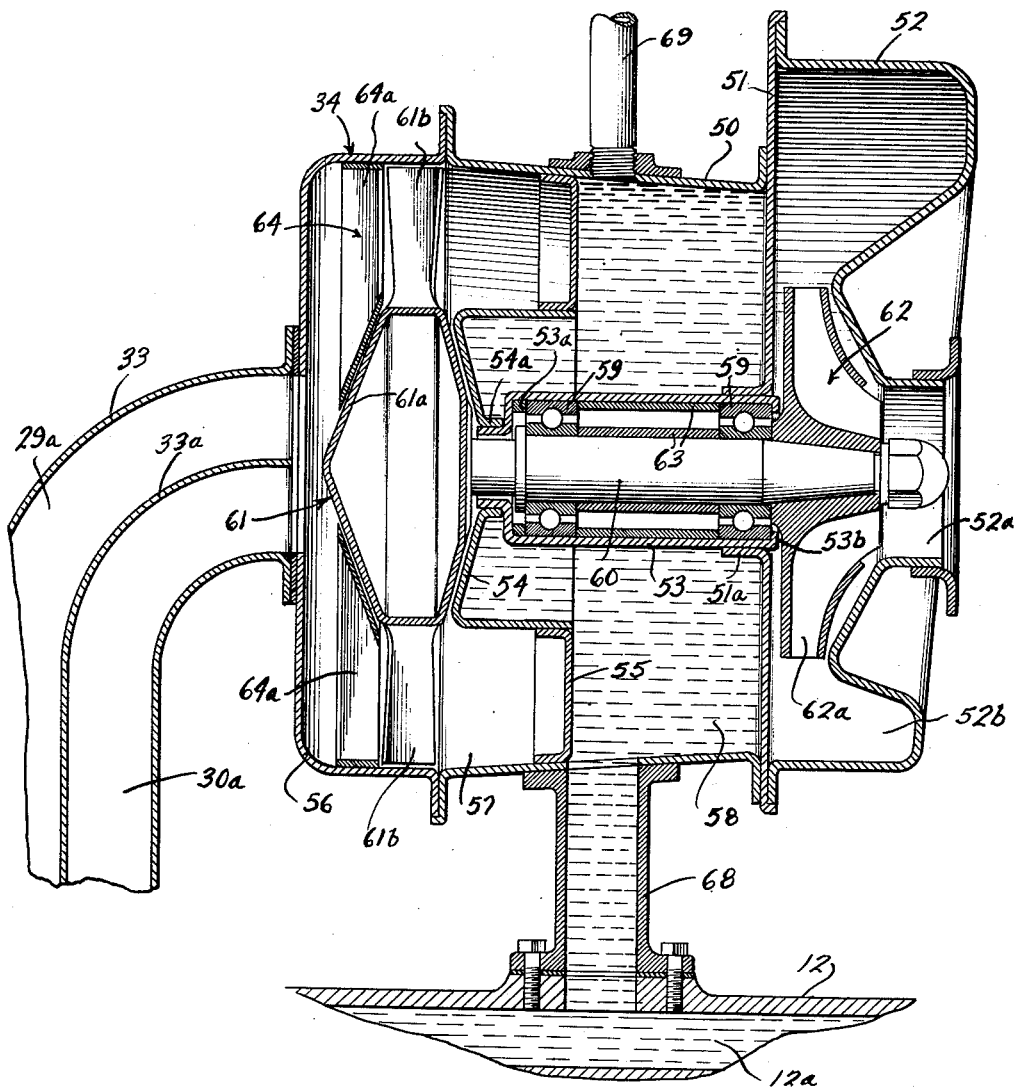
Figure 4 is an enlarged vertical cross-sectional view, with parts in side elevation, taken along the line IV—IV of Figure 3.

In Figure 1 the internal combustion engine 10 includes a conventional water-jacketed block 11 and head 12 with a water pump 13 and fan 14 driven through a belt 15 from a pulley 16 on the crankshaft 17. The pump 13 circulates water through the water spaces in the jacketed block 11 and head 12 through a radiator (not shown) cooled by the fan 14. The conventional hose connection 18 between the radiator and head 12 is shown.

An intake manifold 19 is mounted longitudinally of the block 11 and has communication with the intake valve to each cylinder (not shown) of the engine. The central portion of the intake manifold is surrounded by a heater box 20 and a heating chamber 21 is thereby provided, as best shown in Figures 2 and 5. The manifold 19 has an integral duct 19a extending upwardly therefrom through the top of the heating chamber 21 and registering with the throttle pipe 22 of a carburetor 23. The conventional mounting flanges are provided for attaching the throttle pipe to the heater box 20. Gasoline or other liquid fuel is fed to the carburetor 23 through a feed tube 24. Air is supplied to the carburetor 23 through an air intake pipe 25 (Figs. 1 and 3).

The central portion of the intake manifold 19 has a sump 19b formed thereon in the heating chamber 21 beneath the intake duct 19a thereof so that unvaporized drops of liquid gasoline will be collected in the sump to be vaporized by heat from the heating chamber 21 before being fed into the engine cylinder.

The bottom of the heater box 20 has an exhaust port 20a (Fig. 2) discharging through an exhaust pipe 26. This exhaust pipe, as shown in Fig. 1, is connected to one leg of a Y-fitting 27. The Y-fitting leads to a muffler or silencer (not shown).

The block 11 of the engine 10 has an exhaust manifold 28 mounted longitudinally along the side thereof and connected to each exhaust port of the engine block. This manifold 28, as illustrated in Figure 1, has a low portion 28a extending from the front of the engine block 11 to the heater box 20 and a high portion 28b extending from the heater box 20 to the rear end of the engine block 11. An end wall 28c is provided between the low section 28a and the high section 28b and a second wall 28d is provided at the rear end of the manifold. As shown in Figs. 1, 2, and 6, an integral partition wall 28e extends from the end wall 28c about level with the top of the low portion 28a for providing a bottom passage 29 and a top passage 30. The bottom passage 29 extends for the full length of the manifold and is a continuation of the passage provided by the low manifold portion 28a. The rear end of the partition wall 28e has a vertical leg 28f as best shown in Figures 1 and 5, and this leg extends to a flange 31 on the top of the rear end portion of the manifold. The flange 31 receives a flanged pipe unit 32 thereon. This unit 32, in turn, has the gas intake pipe 33 of a turbosupercharger 34 mounted thereon.

A shaft or rod 35 extends through the passage 29 of the high manifold section 28b and is rotatably journaled in the end walls 28c and 28d. The end of the shaft projecting beyond the end wall 28c, as best shown in Figures 1 and 3, has an arm 36 secured thereon. This arm 36 has its free end pivotally connected to a link 37 which link, in turn, is pivoted on an arm 38 on a shaft 39 extending through the throttle pipe 22 of the carburetor. A throttle valve 40 (Fig. 5) is mounted on the shaft 39 for controlling flow from the carburetor through the throttle pipe 22 into the passage 19a of the intake manifold 19. Another arm 41 on the shaft 39 is arranged for receiving the accelerator rod (not shown). Rotation of the shaft 39 controls the setting of the throttle valve 40 and also effects rotation of the shaft 35.

As best shown in Figures 2 and 5, the exhaust manifold 28 and the heater box 20 have aligned ports providing a passage 42 connecting both passages 29 and 30 of the high manifold portion 28b with the heating chamber 21. This passageway 42 is provided adjacent the end wall 28c of the manifold and the partition wall 28e is cut away opposite the passageway 42 for receiving a damper-type valve plate 43 on the shaft 35. This valve 43 is adapted to close the passage 42 as shown in the solid-line position of Figure 2, thereby separating the exhaust passages 29 and 30 from the heater chamber 21 and preventing flow of gases from the exhaust manifold 28 to the exhaust pipe 26. Alternatively, the valve 43 can be opened by rotating the shaft 35 to place the valve in the dotted-line position of Figure 2 wherein both passages 29 and 30 of the exhaust manifold 28 are in full communication with the heater chamber 21 and with the exhaust pipe 26. In intermediate positions of the valve between the closed solid-line position and the opened dotted-line position, selected proportions of exhaust gases can be diverted from the exhaust manifold into the heating chamber 21.

The end of the shaft 35 projecting beyond the end wall 28d of the exhaust manifold, as best shown in Figure 1, has an arm 44 fixed thereon and connected through link 45 with an arm 46 on a shaft 47 extending through the flanged pipe section 32. A valve plate 48 is mounted in the pipe section 32 on the shaft 47 as best shown in Figure 5. In Figure 5, part of the manifold 28 is illustrated as rotated 90° from the position of Figure 1 to show the relative positions of the valves. The linkage arrangement between the valve shafts 35, 39, and 47 is such that when the throttle valve 40 is half open, the diverting valve 43 will be seven-eighths closed, and the gas shut-off valve 48 will be seven-eighths opened. Then, when the throttle valve is moved from its half opened position to its fully opened position, the valves 43 and 48 are moved from their seven-eighths closed and open positions respectively to their fully closed and open positions respectively. Conversely, when the throttle valve 40 is moved from its half opened position to its closed position, the valve 43 is moved from its seven-eighths closed position to its fully opened position, and the valve 48 is moved from its seven-eighths opened position to its fully closed position. This arrangement thus provides for diversion of exhaust gases in controlled proportions from the exhaust manifold to the heater or to the gas inlet of the turbosupercharger 34 in accordance with the setting of the throttle valve 40.

The turbosupercharger 34, as best shown in Figure 4, is conveniently made from stamped metal parts including an annular main body 50 with a flat disk 51 welded on one end thereof and, in turn, receiving a stamped diffuser ring housing 52 with a central inlet 52a and an annular diffuser chamber or volute chamber 52b. The disk 51 has a circular aperture aligned with the opening 52a of the ring member 52 and surrounded by a collar 51a. A sleeve 53 is secured at one end in this collar 51a and has the opposite end thereof extending into a collar 54a on a cup member 54 which is secured in a ring 55 welded in the body 50. An end cap 56 is secured to the end of the body 50. This end cap and the portion of the body to the left of the ring 55 define a turbine chamber 57 while the portion of the body between the disk 51 and the ring 55 defines a water chamber 58 as will hereinafter be more fully described.

The sleeve 53 carries two bearings 59 which rotatably support a shaft 60 projecting beyond the sleeve to carry a turbine wheel 61 in the chamber 57 and an impeller wheel 62 in the diffuser chamber 52b. The bearings are held in the sleeve 53 in any suitable manner, as by being locked between shoulders 53a and 53b at the ends of the sleeve and separated by spacer sleeves 63.

The turbine wheel 61 has a hollow hub 61a spanning the face of the cup member 54. Turbine buckets 61b project radially around the hub 61a and are integrally fixed to the hub. These buckets have running clearance relationship with the cap 56. A diaphragm ring 64 is fixed in the cap 56 immediately in advance of the turbine wheel 61 and has vanes 64a in front of the buckets 61b for directing exhaust gases from the intake pipe 33 to the buckets 61b for driving the wheel. The intake pipe 33 has a partition wall 33a dividing the pipe into passages 29a and 30a which are extensions of the passages 29 and 30 respectively in the manifold 28. The partition wall 33a is aligned with the apex of the hollow hub 61a so that gases from the passages 29a and 30a flow radially from the very center of the hub to the diaphragm vanes 64a. This uniformly distributes the gases around the turbine wheel.

An exhaust pipe 65 (Figure 1) extends from the body 50 and communicates with the chamber 57 beyond the turbine wheel 61 for discharging the spent exhaust gases out of the supercharger into a pipe 66 which is connected with the other leg of the Y-fitting 27.

The impeller 62 is of the shrouded centrifugal type and has vanes 62a communicating with the inlet 52a and with the diffuser chamber 52b, the impeller serving to centrifugally pump air from the inlet through the diffuser chamber to a peripheral outlet 67 connected to the top of the carburetor air intake pipe 25. Air is thus propelled by centrifugal force from the inlet 52a and is packed into the air inlet 25 for the carburetor 23.

In order to keep the bearings 59 cool, and to insulate the air in the diffuser ring from the hot gases in the turbine chamber, the chamber 58 of the body is cooled with water from the engine cooling system. As shown in Figure 4, the head 12 of the engine has a water space 12a therein. A hollow mounting tube 68 is secured on the head 12 and has a passageway therethrough communicating with the water space 12a. Water from this space flows through the tube 68 into the chamber 58 and thence through a tube 69 at the top of the body connected by a hose 70 with the radiator hose 18 as shown in Figure 1. The bearing-carrying sleeve 53 of the supercharger is thereby surrounded with a body of water being circulated through the chamber 58. In this manner the bearings 59 are kept cool, and hot exhaust gases in the chamber 57 cannot heat air being compressed in the diffuser ring chamber 52b.

The turbosupercharger 34 is only driven when exhaust gases from the manifold 28 are permitted to flow through the inlet pipe 33 for the turbosupercharger. This condition obtains when the valves are set so that the valve 48 is opened, and the valve 43 is closed or substantially closed. As explained hereinabove, such a setting of the valve occurs when the throttle valve 40 is substantially fully opened. In the opened condition of the throttle valve the engine is being operated under heavy loads and it is desirable, for efficient operation, to "pack" as much air as possible into the fuel mix.

When the engine is idling or is being operated at part throttle conditions, the valve 43 is opened or substantially opened and the valve 48 is closed or substantially closed. In these valve settings the exhaust gases are diverted from the manifold 28 through the heating chamber 21 to the exhaust pipe 26 and the supercharger does not receive the exhaust gases. As a result, air to the fuel mix flows through the supercharger inlet, impeller, and diffuser chamber as drawn in by the pistons of the engine. The intake path of the air through the turbosupercharger is substantially unimpeded.

While the valve 48 is illustrated for shutting off exhaust gas flow through the turbosupercharger 34, this valve may not be necessary when the exhaust pipes 26 and 66 from the heater box and turbosupercharger are connected together in a single fitting such as 27 for discharge into a single muffler. Under these conditions any back pressure on the exhaust gases in the intake pipe 33 and the discharge pipe 65 for the turbosupercharger will be equalized and the turbosupercharger will not be driven. The valve 48 is useful, however, and has been illustrated. Such a valve would be necessary if the supercharger and heater box discharged through separate mufflers.

From the above description it will be understood that the invention provides a fuel system for internal combustion engines wherein exhaust gases from the engine manifold are selectively diverted through a supercharger for driving the turbosupercharger or through a heater box for heating the fuel mix. The selected paths for the exhaust gases are predetermined by the setting of the throttle valve of the engine carburetor so that the fuel mix will be heated by the exhaust gases at part throttle conditions, and will be supercharged at full or substantially full throttle conditions.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fuel system for an internal combustion engine comprising an exhaust manifold, an intake manifold, a heater box surrounding a portion of the intake manifold and communicating with the exhaust manifold, a supercharger having a turbine wheel and an impeller driven thereby, means connecting the exhaust manifold with the turbine wheel to drive the wheel with exhaust gases, a fuel and air mixing device receiving air from the supercharger and discharging into the intake manifold, a throttle controlling said discharge into the intake manifold, a valve for controlling flow of exhaust gases from the exhaust manifold to the heater box, and means for linking the throttle and valve for co-movement with the valve being closed when said throttle is fully opened and the valve being opened when said throttle is fully closed, whereby exhaust gases are selectively diverted to said supercharger and to said heater box in accordance with the throttle setting of said engine.

2. A fuel system for internal combustion engines comprising a fuel and air mixing device, a supercharger for supplying air to said device, an exhaust gas-driven turbine adapted to drive said supercharger, a heater for heating the fuel mix from said device, a throttle for controlling fuel mix flow from said device, and means for selectively flowing exhaust gases from the engine charged by said device to the turbine and to the heater, said means including an exhaust gas flow connection from said engine to said turbine, a second exhaust gas flow connection from said engine to said heater, a valve in each of said exhaust gas flow connections, and control means linking each of said valves to said throttle for co-movement therewith, that valve in said flow connection from said engine to said turbine being open when said throttle valve is open and being closed when said throttle valve is fully closed, and that valve in said connection from engine to said heater being open when said throttle valve is closed and being closed when said throttle valve is fully open, whereby said exhaust gases may be diverted upon actuation of said throttle for selectively driving the turbine and heating the heater in accordance with the setting of said throttle.

3. A fuel system for an internal combustion engine comprising an exhaust manifold for mounting alongside of the engine in communication with the exhaust ports thereof, said manifold having a passageway extending along the length thereof and communicating with the exhaust ports at one end of the engine to convey the exhaust gases to the other end of the engine, said manifold having a second passageway connecting the remaining exhaust ports of the engine with said same other end of the engine, a supercharger mounted on said engine, a turbine wheel in said supercharger for driving the same, an inlet pipe for said supercharger having separate passageways respectively connecting the passageways of the manifold with the central portion of the turbine wheel to drive the supercharger, an impeller in said supercharger driven by said turbine wheel, a diffuser ring surrounding said impeller, a discharge pipe extending from said diffuser ring, a fuel and air mixing device having an air inlet connected with said discharge pipe, a fuel intake for said device, a throttle valve controlling flow of air and fuel from said device, a heater for heating the fuel and air from said device, and a valve controlled by said throttle selectively diverting gases from both of said passageways of the exhaust manifold to said heater or to said intake pipe for the supercharger.

4. An engine fuel system comprising a fuel and air mixer, a movable throttle valve for controlling fuel-air mixture flow through said mixer, a turbine-driven supercharger for packing air into the mixer, an exhaust gas heater for heating the fuel mix from the mixer, and means for selectively proportioning exhaust gas flow to the turbine and heater, said means including a first conduit for conveying exhaust gases from the engine to said turbine-driven supercharger, a second conduit communicating with said first conduit and with said heater, a diverting valve located between said conduits and a shut-off valve located in said first conduit, and means linking said diverting and said shut-off valves to said throttle valve for co-movement, said diverting valve serving to proportion exhaust gases between said heater and said turbine, and said shut-off valve serving to interrupt the flow of exhaust gases to said turbine when said engine is operating at closed throttle.

5. In combination with an internal combustion engine, a carburetor, a supercharger for packing air into the carburetor, an exhaust gas-actuated motor for driving the supercharger, a throttle valve controlling fuel mix flow from the carburetor to the engine, a heater having an exhaust gas chamber surrounding the fuel mix flow path between the carburetor and the engine, and a damper linked to the throttle valve and arranged to selectively divert exhaust gas flow from the engine to the motor and to the heater chamber in accordance with the degree of opening of the throttle valve, said damper interrupting the flow of exhaust gases to the motor when the engine is operating at closed throttle, whereby exhaust gases are diverted to said heater chamber, and said damper interrupting the flow of exhaust gases to said heater when said engine is operating at full open throttle, thereby diverting the exhaust gas flow to said motor.

6. An engine fuel system comprising an exhaust gas manifold, a fuel and air mixer, a shaft-mounted throttle valve for said mixer, a fuel mix heater receiving fuel and air from the mixer and having an exhaust gas-receiving chamber connected with the manifold, a discharge pipe for said chamber, a turbine-driven supercharger having an air blower portion discharging into the mixer and an exhaust gas turbine portion receiving exhaust gas from the manifold and discharging the spent gases into the discharge pipe, a rock shaft extending through the manifold, a linkage connecting the throttle valve shaft and the rock shaft for co-movement, a damper in the manifold on the rock shaft for diverting gases from the manifold to the heater chamber or to the turbine portion of the supercharger, a second shaft-mounted valve controlling flow of exhaust gas from the manifold to said turbine portion, and a second linkage connecting the rock shaft and shaft of the second valve for co-movement.

7. In a multi-cylinder elongated internal combustion engine having a carburetor for forming a fuel-air mixture and a throttle valve for controlling the introduction of the fuel-air mixture into the engine, an exhaust manifold extending along the length of the engine having a first passage along the length thereof communicating with the exhaust ports of a first group of cylinders at one end of the engine and a second passage partially along the length thereof communicating with the exhaust ports of a second group of cylinders at the other end of the engine, a turbine-driven supercharger for the engine, a turbine for driving said supercharger, an inlet pipe with separate passages respectively connecting the first and second passages of the manifold with the turbine, a valve located in said exhaust manifold for controlling the introduction of the exhaust gases through both of said passages into said turbine, means linking said valve with said throttle valve for co-movement therewith, and said means being constructed and arranged to increase the introduction of exhaust gases into said turbine portion in proportion to an increase in the degree of throttle opening.

ALEX TAUB.

REFERENCES CITED

The following references are of record in the file of this patent:

UNITED STATES PATENTS

| Number | Name | Date |
|---|---|---|
| 1,447,975 | Francis | Mar. 13, 1923 |
| 1,612,053 | Restany | Dec. 28, 1926 |
| 1,680,373 | Francis | Aug. 14, 1928 |
| 1,816,737 | Moss | July 28, 1931 |
| 1,860,449 | Büchi | May 31, 1932 |
| 2,159,422 | Büchi | May 23, 1939 |
| 2,164,451 | Fast | July 4, 1939 |
| 2,297,235 | Müller | Sept. 29, 1942 |
| 2,434,726 | Udale | Jan. 20, 1948 |